(12) United States Patent
Friedland

(10) Patent No.: US 6,347,296 B1
(45) Date of Patent: Feb. 12, 2002

(54) CORRECTING SPEECH RECOGNITION WITHOUT FIRST PRESENTING ALTERNATIVES

(75) Inventor: Steven J. Friedland, Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/338,699

(22) Filed: Jun. 23, 1999

(51) Int. Cl.[7] .................. G10L 15/22; G10L 15/26; G10L 21/00
(52) U.S. Cl. .............. 704/231; 704/270; 704/251; 704/252
(58) Field of Search .................. 704/270, 272, 704/278, 231, 251, 252

(56) References Cited

U.S. PATENT DOCUMENTS

| 4,797,855 A | * | 1/1989 | Duncan, IV et al. ......... 400/63 |
| 4,829,576 A | * | 5/1989 | Porter ......................... 704/235 |
| 4,859,091 A | * | 8/1989 | Ueda ............................ 400/63 |
| 4,866,778 A | * | 9/1989 | Baker ........................ 704/235 |

\* cited by examiner

*Primary Examiner*—Richemond Dorvil
*Assistant Examiner*—Daniel A Nolan

(57) ABSTRACT

A method and a system within a computer speech recognition system to automatically correct portions of text. The invention receives text derived from a first user input for inclusion in a body of text. Concurrently upon receipt of the first user input, and based upon the first user input, the system identifies a list of alternate text selections potentially intended by the user. Next, the system stores each of the alternate text selections in a memory location associated with the text. In response to a second user input, and without displaying the list of alternate text selections to the user, the system automatically retrieves a first one of the alternate text selections from the memory location and inserts the first one of the alternate text selections in place of the text in the body of text.

19 Claims, 5 Drawing Sheets

CORRECTING SPEECH RECOGNITION WITHOUT FIRST PRESENTING ALTERNATIVES

BACKGROUND OF THE INVENTION

1. Technical Field

This invention relates to the field of speech recognition software and more particularly to replacing text within a body of text with alternate text selections.

2. Description of the Related Art

Speech recognition is the process by which an acoustic signal received by microphone is converted to a set of text words by a computer. These recognized words may then be used in a variety of computer software applications for purposes such as document preparation, data entry, and command and control.

One important area where speech recognition technology has proved to be very useful is the conversion of spoken utterances into text for inclusion in a word processing document. Word processing applications may have incorporated therein a speech recognition function. Alternatively, a variety of speech recognition programs are commercially available which provide the speech recognition function to existing non-speech enabled word processing applications. In any case, the ability of these speech enabled word processing applications to convert human speech into text has improved dramatically in recent years. Due to a variety of factors, however, errors may yet occur in the speech recognition function performed by such applications. Accordingly, it is often necessary for a user to review a document which has been dictated to a word processing application by means of such speech recognition software.

One notable aspect of text errors existing in a speech enabled word processing application is that they tend not to be misspelled, but are instead words which have been "misrecognized". Such text errors are typically a close acoustic match to the correct text, but often involve spelling variations or in some instances may be an entirely unrelated but similar sounding word or words.

Another source of error within text, completely unrelated to speech recognition systems, is user error. User errors may include, but are not limited to, misspelling of text within a body of text, grammatical errors within a body of text, or incorrect keystrokes from a user keyboard entry.

A spell check function within a word processing program is an example of a conventional system of correcting errors within a body of text. In the case of a spell check function, the system is initiated by a first user input selecting for replacement either a potentially misspelled word or a grammatically incorrect portion of text. This step is commonly performed with a series of keyboard entries or a pointing device such as a mouse. For example, a keyboard or a mouse is manipulated by the user to highlight text within a body of text. Next, in response to a second user input, a list of alternate text selections is displayed to the user. The user then selects an appropriate alternate text selection from the displayed list of alternate text selections. In response to the user's selection, the system inserts the user selected alternate text selection in place of the selected text.

Other conventional spell check functions allow the user to select a correction option to initiate spell checking throughout an entire word processing document. In this case the user does not select text for replacement, instead the system searches the body of text for potential spelling and grammatical errors made by the user. Once the system identifies a potential spelling or grammatical error, the system displays a list of potential alternative text selections to the user. Similar to the previously described spell check function, the user then selects an appropriate alternate text selection from the displayed list of alternate text selections. The user selected alternate text selection is then inserted into the body of text in place of the selected text.

Although conventional systems of correcting errors within a body of text have functioned reasonably well in the past, there are a number of disadvantages inherent to such systems. One such disadvantage is that conventional systems utilize a visual interface. By using a visual interface, conventional systems must employ a large display device such as a computer monitor. The need for a large display device severely limits the ways in which a conventional system of correcting errors within a body of text can be incorporated into other systems and existing technologies. A large display device further limits the environments in which conventional systems can be used.

Another disadvantage of conventional systems for replacing text within a body of text is that such systems must display the list of alternate text selections to the user. For example, a list of alternate text selections is usually displayed to the user on a computer monitor via a window or other pop-up style computer dialog box. This can result in an excessive number of open windows on the computer monitor leading to window "clutter" and obstruction of the main window containing the text being edited.

Moreover, the need to have several open windows at once within a conventional system for replacing text within a body of text demands a sizable display device. The display device must be large enough for the user to comfortably view several alternate text selections simultaneously with the text being edited. However, size limitations of common display devices force information to be presented to the user in a crowded and cluttered fashion. Consequently, as mentioned before, the alternate text selections usually obscure the user's view of the text being edited. As a result, there has arisen a need for a more efficient way to replace text within a body of text with alternative text selections.

SUMMARY OF THE INVENTION

The invention concerns a method and system for automatically correcting portions of text. The method of invention involves a plurality of steps including: receiving text derived from a first user input for inclusion in a body of text; concurrently upon receipt of the first user input, and based upon the first user input, identifying a list of alternate text selections potentially intended by the user; storing each of the alternate text selections in a memory location associated with the text; and in response to a second user input, and without displaying the list of alternate text selections to the user, automatically retrieving a first one of the alternate text selections from the memory location and inserting the first one of the alternate text selections in place of the text in the body of text. In response to a third user input, the method can further include the additional step of automatically replacing the first alternate text selection in the body of text with a second one of the alternate text selections in response to a third user input.

Additionally, in response to a fourth user input, the invention can include the step of replacing the second alternate text selection in the body of text with at least one of the text and the alternate text selections, which has previously been included in the body of text. For example, in response to a user input, the invention would replace an alternate text selection with a previously used alternate text selection, or alternatively, replace an alternate text selection with the original text.

Although the invention can accept a variety of suitable user inputs, one advantageous embodiment can accept user input in the form of a spoken utterance. In this embodiment, the text and the alternate text selections can be derived from the spoken utterance by a speech recognition engine. Another embodiment of the invention can derive the text from a user keyboard entry. In yet another embodiment of the invention, the second user input can include selecting the text to be replaced, and articulating a spoken command for requesting replacement of the text with one of the alternate text selections.

According to a second aspect, the invention can be a system for automatically correcting portions of text in a computer speech recognition system. In that case, the system includes: programming for receiving text derived from a first user input for inclusion in a body of text; programming for identifying a list of alternate text selections potentially intended by the user concurrently upon receipt of the first user input, and based upon the first user input; programming for storing each of the alternate text selections in a memory location associated with the text; and in response to a second user input, programming for automatically retrieving a first one of the alternate text selections from the memory location, and inserting the first one of the alternate text selections in place of the text in the body of text without displaying the list of alternate text selections to a user.

Additionally, in response to a third user input, the system can include programming for automatically replacing the first alternate text selection in the body of text with a second one of the alternate text selections. Further, in response to a fourth user input, the system preferably includes programming for replacing the second alternate text selection in the body of text with at least one of the text and the alternate text selections, which has previously been included in the body of text.

Similar to the previously described method, the system can include programming to accept a variety of suitable user inputs wherein each of the user inputs may include a spoken utterance or a user keyboard entry. In the case of a spoken utterance user input, the text and the alternate text selection can be derived from the spoken utterance by a speech recognition engine. In another embodiment where the system automatically retrieves the first one of the alternate text selections and inserts the first one of the alternate text selections in place of the text in the body of text, the system can include programming which allows the user to select the text in the body of text, and articulate a spoken command for requesting replacement of the text with one of the alternate text selections.

Finally, the invention may take the form of a machine-readable storage having stored thereon a computer program having a plurality of code sections executable by a machine for causing the machine to perform a set of series of steps. These steps can include: receiving text derived from a first user input for inclusion in a body of text; concurrently upon receipt of the first user input, and based upon the first user input, identifying a list of alternate text selections potentially intended by a user; storing the alternate text selections in a memory location associated with the text; and in response to a second user input, and without displaying the list of alternate text selections to a user, retrieving a first one of the alternate text selections from the memory location and replacing the text with the first one of the alternate text selections.

The machine-readable storage, in response to a third user input, may also cause the machine to perform the further step of replacing the first alternate text selection in the body of text with a second one of the alternate text selections. In response to a fourth user input, the machine-readable storage can also be programmed for causing the machine to perform the additional step of replacing the second alternate text selection in the body of text with at least one of the text and the alternate text selections which has previously been included in the body of text. The machine-readable storage can further be programmed for causing the machine to perform the additional step of deriving the text and each of the alternate text selections from a spoken utterance by a computer speech recognition engine, and alternatively, deriving the text from a user keyboard entry.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
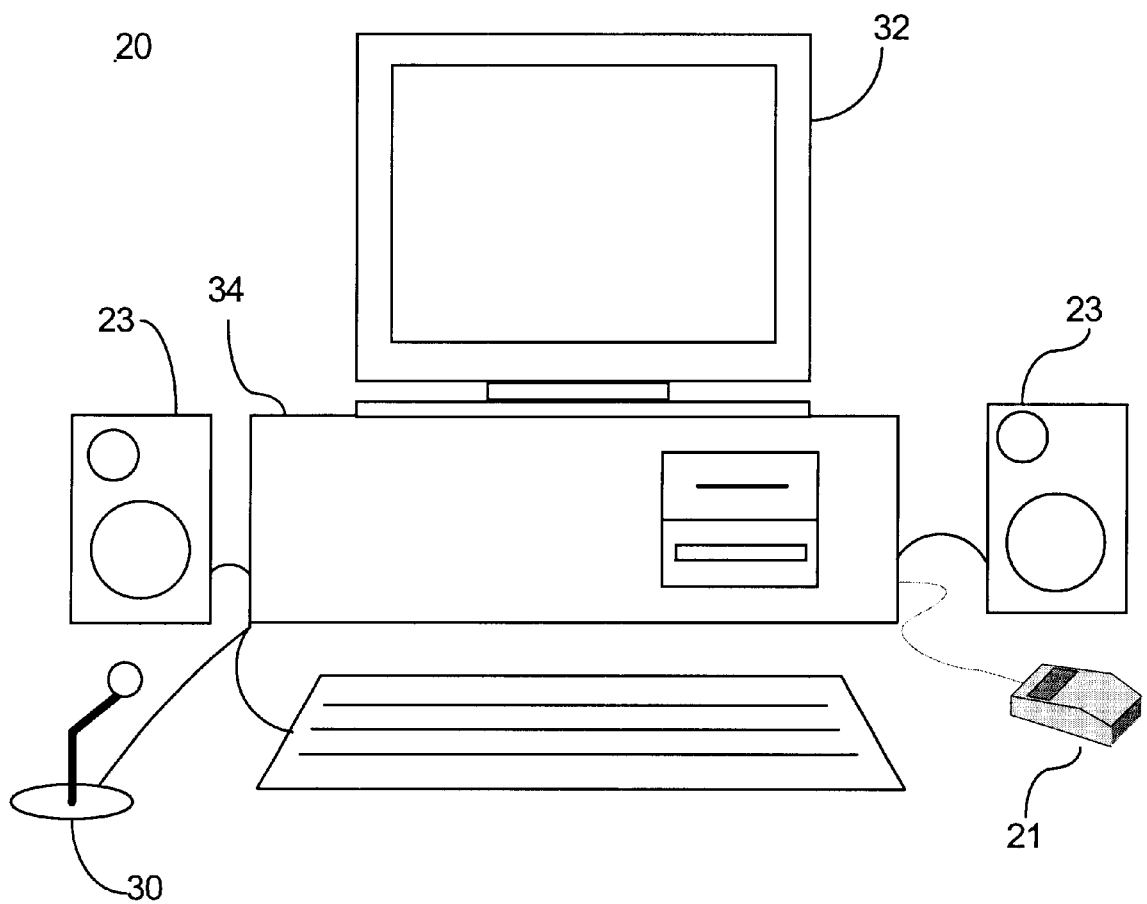
FIG. 1 shows a computer system for speech recognition which is known in the prior art.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may be provided with the system, but are not necessary for operation of the invention as described herein.

The various hardware requirements for the computer system as described herein can generally be satisfied by any one of many commercially available high-speed multimedia personal computers offered by manufacturers such as International Business Machines Corporation, Compaq, Hewlett Packard, or Apple Computers.

Figure 2:
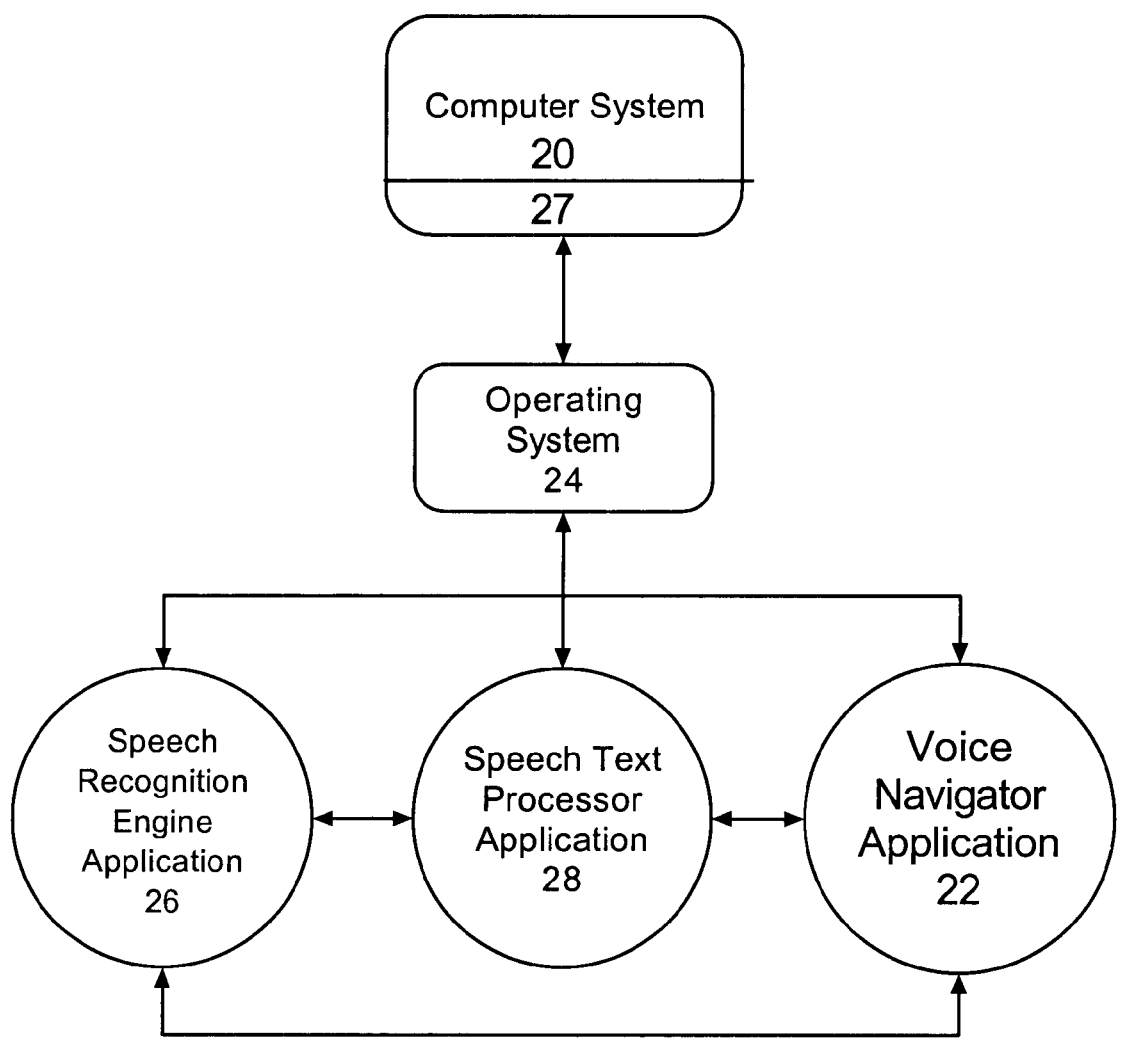
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. In the example shown, a speech text processor application 28 and a voice navigator application 22 are also provided. However the invention is not limited in this regard and the speech recognition engine application 26 can be used with any other application program which is to be voice enabled. In FIG. 2, the speech recognition engine 26, speech text processor 28 and the voice navigator 22 are shown as separate application programs. It should be noted however that the invention is not limited in this regard, and these various application programs could be implemented as a single, more complex applications program. For example the speech recognition application 26 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 5A:
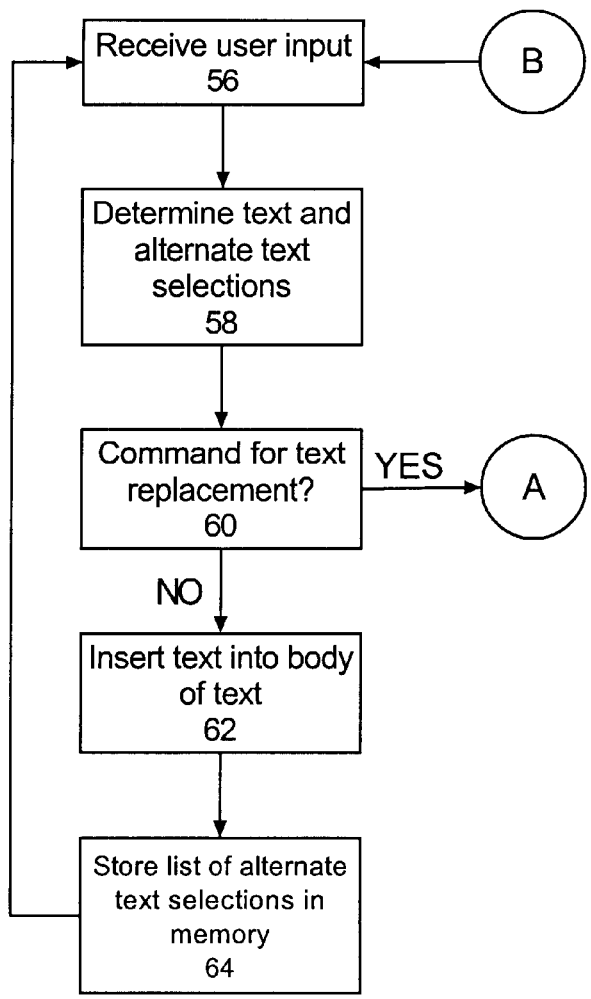
FIG. 5 is a flow chart illustrating a process for replacing text within a body of text with alternate text selections.

FIG. 5 is a flow chart illustrating a process for replacing text within a body of text with alternate text selections. According to a preferred embodiment, the system is placed into a dictation or typing mode for receiving text from a user input for inclusion within a body of text. In FIG. 5(a), the system receives a user input at step 56 in the form of a user-spoken utterance received by microphone 30 or a user keyboard entry. If the user input received at step 56 is in the form of a user-spoken utterance, then the speech recognition engine application 26 converts the spoken utterance into text for inclusion in a word processing document or other body of text. If the user input received at step 56 is in the form of a user keyboard entry, then the text is derived directly from the user's keystrokes.

In step 58, if the user input is a spoken utterance, then the speech recognition engine application 26 identifies a list of alternate text selections potentially intended by the user. Typically, the number of alternate text selections is between 4 and 8, but the invention is not limited in this regard and any suitable number of alternate text selections is acceptable. Alternatively, the user can specify the number of alternate text selections that the speech recognition engine application 26 identifies. Preferably the alternate text selections derived by the speech recognition engine application 26 are words that sound similar or are a close acoustic match to the spoken utterance. If the user input is a user keyboard entry, then as each word is typed, the system recognizes apparent user errors such as misspelled words, grammatical errors, or incorrect keystrokes. Such error detection can be accomplished using conventional processing techniques which are known in the art. Spell check technology is one example of a conventional processing technique. For each word processed by the system, a list of alternate text selections potentially intended by the user is determined.

In step 60, the system analyzes the user input to determine whether the user input is a user command requesting replacement of text or alternatively, additional text for inclusion within the body of text. If the user input received at step 56 is additional text to be included within the body of text, then the system proceeds to step 62. The system then in step 62 inserts the text into the word processing document or body of text.

Regardless of the specific method used to determine the alternate text selections, the list of alternate text selections is stored in step 64 in a memory location associated with each recognized word. The alternate text selections are preferably stored in an order corresponding to the statistical likelihood that they were intended by the user, or alternatively, such statistical information can be encoded and associated or stored with the words. It will be appreciated by those skilled in the art that such statistical information regarding alternates can be provided by the speech recognition engine or conventional spell checking systems.

Figure 5B:
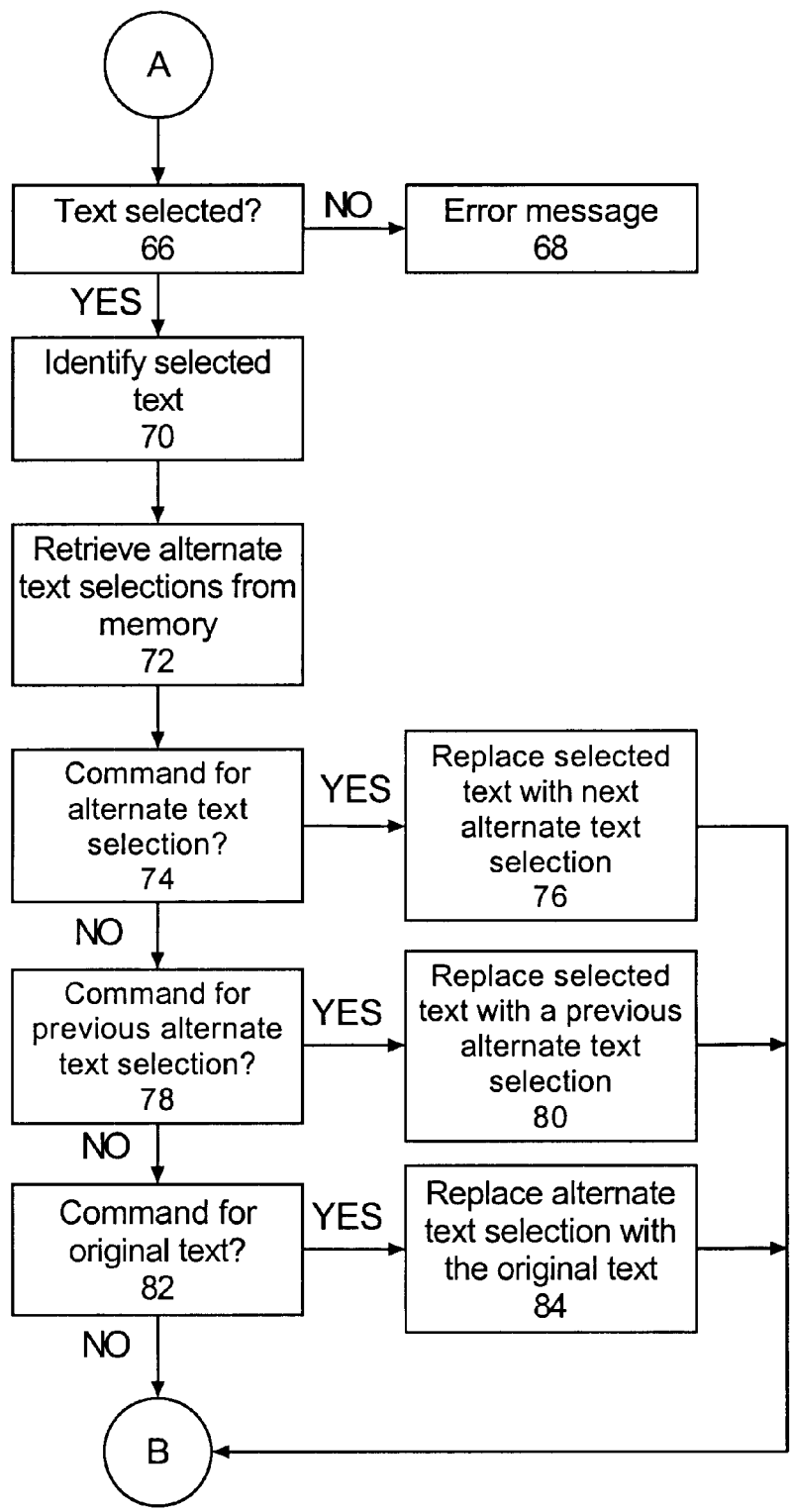

If the user input received at step 56 is determined at step 60 to be a command for replacement of text within the body of text, then the system continues to step 66 in FIG. 5(b). In step 66 the system determines whether any text within the body of text has been selected for replacement. In a preferred embodiment, the word to be corrected or replaced is the last word dictated or typed into the body of text prior to receiving the correction command as user input in step 56. Thus, in FIG. 3(a), the error word would be "four", which is the last word appearing before the cursor. However, it will be readily appreciated that any suitable means can be used for identifying the error word and the invention is not limited in this regard. For example, within the body of text, the user can identify a word or portion of text to be replaced. The text can be selected, highlighted, or otherwise marked using a mouse or keyboard. Alternatively, the word to be corrected can be spoken by a user as part of the command for text replacement. If no text has been entered into the word processing document or body of text, then the system proceeds to step 68 in FIG. 5(b) where an error message is displayed to the user indicating that no text has been selected for replacement.

If text has been selected, then in FIG. 5(b) in step 70, the system identifies the text to be corrected or replaced. Once the text to be corrected or replaced is identified, in step 72 the system subsequently retrieves the alternate text selections from the memory location associated with the text to be corrected or replaced.

In step 74 the system determines whether the user command is requesting replacement of text with an alternate text selection. If so, then the system automatically replaces the selected text with a first alternate text selection as shown in step 76. Since the alternates are either coded or stored in an order corresponding to the statistical probability that the alternate was intended by the user, the first alternate word is the alternate word that the system has determined was most likely intended in place of the original text. In step 76, the original text is preferably stored in the memory location associated with the remaining alternates. Once the original text has been replaced, the system returns to step 56 in FIG. 5(*a*) to await the next user input. If the command again directs that the substituted or alternate text is to be replaced with an alternate text selection in step 74 in FIG. 5(*b*), the process in step 76 is repeated by replacing the first alternate text selection with a second alternate text selection. This process can be repeated until all of the alternate words have been exhausted.

In step 74, if it is determined that the user command did not request an alternate text selection, the system moves on to step 78. In step 78 the system determines whether the user command is requesting replacement of an alternate text selection with a previous alternate text selection. If so, then in step 80 the system automatically replaces the alternate text selection within the body of text with the previous alternate text selection. For example, if the user has rejected the first two alternate text selections from the system, and the system has inserted a third alternate text selection within the body of text, the user may decide that the second alternate text selection was appropriate. In response to a user command requesting a previous alternate text selection, the system can replace the third alternate text selection with the second alternate text selection.

If the system determines in step 78 that the user command did not request a previous alternate text selection, then the system proceeds to step 82. In step 82, the system determines whether the user command is a request for replacement of an alternate text selection with the original text. If so, the system retrieves the original text from memory in step 84 and automatically replaces the alternate text selection with the original text.

As depicted in FIG. 5(*b*), by issuing user commands requesting replacement of text with alternate text selections or previous alternate text selections, the user can cycle back and forth from the most likely alternate text selection to the least likely text selection. Furthermore, as shown in step 82, the system can respond to a specific user command requesting reinsertion of the original text into the body of text thereby replacing an alternate text selection.

Figure 3:
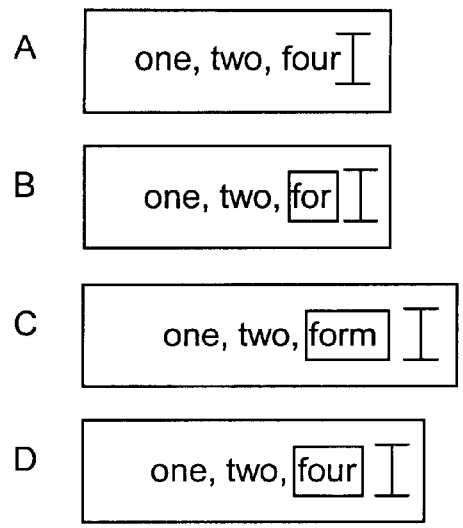
FIG. 3 depicts system responses to user inputs requesting replacement of text with alternate text selections.

FIG. 3(*a*) illustrates a series of words incorporated into a body of text. In the absence of any other user marked or selected text, the cursor position signifies that the word "four" was the last portion of text derived from a speech recognition engine application 26 and incorporated into the body of text. In response to a user command requesting replacement of text with an alternate text selection, the system preferably automatically selects the word "four".

FIG. 3(*b*) illustrates the situation where the user issues a user command for a next alternate text selection and the system automatically replaces the selected text "four" with the alternate text selection "for". In this example, the word "for" is the most likely intended alternate text selection based upon the original text "four".

FIG. 3(*c*) illustrates the system response to a user command requesting another alternate text selection. The system automatically replaces the alternate text selection "for" with the second alternate text selection "form".

FIG. 3(*d*) illustrates the system response to a user command requesting replacement of the alternate text selection with the original text. The second alternate text selection "form" has been replaced with the original text "four". In another embodiment of the invention, instead of the user issuing a specific command requesting the original text, the user could alternatively continue to issue commands requesting a next or previous alternate text selection until the system cycles through the list of alternate text selections and upon exhausting the list of alternate text selections, the system can automatically insert the original text.

Figure 4:
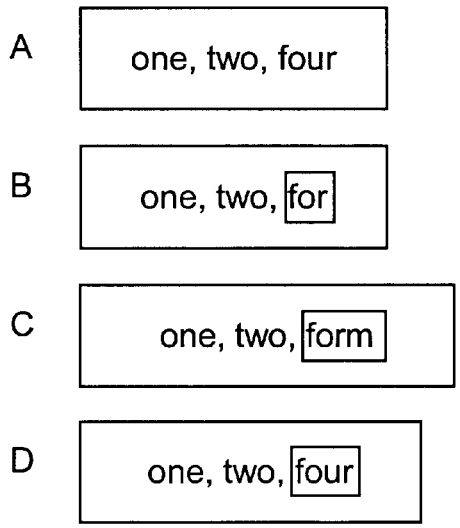
FIG. 4 depicts system responses to a user selecting a portion of text to be replaced and subsequently requesting replacement of the text with alternate text selections.

FIG. 4 is similar to FIG. 3 in all respects except that in FIG. 3(*a*), instead of the system identifying the text to be replaced, the user selects the word "four" for replacement from within the body of text.

One particularly useful embodiment of the invention incorporates a minimally sized user interface display unit 32. Because the system automatically inserts alternate text selections within the body of text, the user only needs to view the single line of text to be edited. Consequently, either a single or multiple line liquid crystal display like those used within pagers or electronic organizers such as the Palm Pilot brand organizer can be substituted for the larger video display terminal. This substitution substantially reduces the overall size of the system and allows the system to be incorporated into mobile technologies.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech recognition system, a method of automatically correcting portions of text comprising:

receiving text derived from a first user input for inclusion in a body of text;

concurrently upon receipt of said first user input, and based upon said first user input, identifying alternate text selections potentially intended by said user;

storing each of said alternate text selections in a memory location associated with said text;

in response to a second user input identifying at least a portion of said text, and without displaying said alternate text selections to said user, automatically retrieving a first one of said alternate text selections from said memory location and inserting said first one of said alternate text selections in place of said at least a portion of said text in said body of text.

2. The method according to claim 1 further comprising the step of:

in response to a third user input, automatically replacing said first alternate text selection in said body of text with a second one of said alternate text selections.

3. The method according to claim 2 further comprising the step of:

in response to a fourth user input, replacing said second alternate text selection in said body of text with at least one of said text and said alternate text selections, which has previously been included in said body of text.

4. The method according to claim 1 wherein each of said user inputs is a spoken utterance.

5. The method according to claim 4 wherein said text and each of said alternate text selections are derived from said spoken utterance by a computer speech recognition engine.

6. The method according to claim 1 wherein said text is derived from a user keyboard entry.

7. The method according to claim 1 whereby said second user input includes:

selecting said text to be replaced; and articulating a spoken command for requesting replacement of said text with one of said alternate text selections.

8. In a computer speech recognition system, a system for automatically correcting portions of text comprising:

means for receiving text derived from a first user input for inclusion in a body of text;

means for identifying alternate text selections potentially intended by said user concurrently upon receipt of said first user input, and based upon said first user input;

means for storing each of said alternate text selections in a memory location associated with said text;

means for automatically retrieving a first one of said alternate text selections from said memory location, and inserting said first one of said alternate text selections in place of at least a portion of said text in said body of text, in response to a second user input identifying said at least a portion of said text, and without displaying said alternate text selections to said user.

9. The system according to claim 8 further comprising:

means for automatically replacing said first alternate text selection in said body of text with a second one of said alternate text selections in response to a third user input.

10. The system according to claim 9 further comprising:

means for replacing said second alternate text selection in said body of text with at least one of said text and said alternate text selections, which has previously been included in said body of text, in response to a fourth user input.

11. The system according to claim 8 wherein each of said user inputs is a spoken utterance.

12. The system according to claim 11 whereby said means for receiving said text and identifying each of said alternate text selections is a computer speech recognition engine.

13. The system according to claim 8 whereby said text is derived from a user keyboard entry.

14. The system according to claim 8 whereby said means of automatically retrieving a first one of said alternate text selections and inserting said first one of said alternate text selections in place of said text in said body of text includes:

means for said user to select said text in said body of text; and means of requesting, by articulating a spoken command, replacement of said text in said body of text with one of said alternate text sections.

15. A machine readable storage, having stored thereon a computer program having a plurality of code sections executable by a machine for causing the machine to perform the steps of:

receiving text derived from a first user input for inclusion in a body of text;

concurrently upon receipt of said first user input, and based upon said first user input, identifying alternate text selections potentially intended by said user;

storing said alternate text selections in a memory location associated with said text;

in response to a second user input identifying at least a portion of said text, and without displaying said alternate text selections to said user, retrieving a first one of said alternate text selections from said memory location and replacing said at least a portion of said text with said first one of said alternate text selections.

16. The machine readable storage according to claim 15 for causing the machine to perform the further step of:

in response to a third user input, replacing said first alternate text selection in said body of text with a second one of said alternate text selections.

17. The machine readable storage according to claim 16 for causing the machine to perform the further step of:

in response to a fourth user input, replacing said second alternate text selection in said body of text with at least one of said text and said alternate text selections which has previously been included in said body of text.

18. The machine readable storage according to claim 15 causing the machine to perform the further step of:

deriving said text and each of said alternate text selections from a spoken utterance by a computer speech recognition engine.

19. The machine readable storage according to claim 15 causing the machine to perform the further step of:

deriving said text from a user keyboard entry.

* * * * *